(12) United States Patent
Briski

(10) Patent No.: US 9,485,961 B2
(45) Date of Patent: Nov. 8, 2016

(54) FOLD UP PET BOWL OR FOUNTAIN PEDESTAL

(71) Applicant: Pioneer Pet Products, LLC, Cedarburg, WI (US)

(72) Inventor: Mark J. Briski, Mequon, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 14/642,228

(22) Filed: Mar. 9, 2015

(65) Prior Publication Data

US 2015/0250147 A1    Sep. 10, 2015

Related U.S. Application Data

(60) Provisional application No. 61/949,635, filed on Mar. 7, 2014.

(51) Int. Cl.
| F16M 11/00 | (2006.01) |
| A01K 7/00 | (2006.01) |
| A01K 5/01 | (2006.01) |

(52) U.S. Cl.
CPC .............. *A01K 7/00* (2013.01); *A01K 5/0114* (2013.01)

(58) Field of Classification Search
CPC combination set(s) only.
See application file for complete search history.

(56) References Cited

U.S. PATENT DOCUMENTS

| 118,478 | A | * | 8/1871 | Parker | A47F 5/13 |
| | | | | | 108/159 |
| 143,836 | A | * | 10/1873 | Newcomb | F16M 11/22 |
| | | | | | 248/167 |
| 162,131 | A | * | 4/1875 | Williams | F16M 11/00 |
| | | | | | 248/165 |
| 376,767 | A | | 1/1888 | Creque | |
| 839,062 | A | | 12/1906 | Gagnon | |
| 927,746 | A | * | 7/1909 | Murphy | F16M 11/00 |
| | | | | | 248/165 |
| 965,194 | A | | 7/1910 | Karbiner | |
| 1,722,521 | A | | 7/1929 | Hiatt | |
| 1,931,584 | A | | 10/1933 | Luff | |
| 1,979,843 | A | | 11/1934 | Roos | |
| 2,054,600 | A | * | 9/1936 | Hoza | F16M 11/22 |
| | | | | | 248/167 |
| 3,207,462 | A | * | 9/1965 | Zimmerman | A47C 7/002 |
| | | | | | 248/159 |
| 3,262,406 | A | | 7/1966 | Nickolaisen | |
| 3,779,176 | A | | 12/1973 | Piretti | |
| 3,924,890 | A | | 12/1975 | Brennan, Jr. | |
| 4,214,724 | A | | 7/1980 | Geiger | |
| 4,377,269 | A | | 3/1983 | Sellner | |
| 4,582,282 | A | * | 4/1986 | Gracie | G10G 5/00 |
| | | | | | 248/167 |
| D176,036 | S | | 11/1995 | Rappaport | |
| 5,746,405 | A | * | 5/1998 | Dvorak | F24H 9/06 |
| | | | | | 248/146 |
| 5,871,185 | A | | 2/1999 | Phillips et al. | |
| 6,234,434 | B1 | * | 5/2001 | Avinger | A47G 33/12 |
| | | | | | 248/188.7 |
| 6,688,565 | B1 | * | 2/2004 | Chen | F16M 11/16 |
| | | | | | 248/166 |
| 7,252,271 | B2 | | 8/2007 | Stephens | |
| 7,777,110 | B2 | * | 8/2010 | Wallis | G10G 5/00 |
| | | | | | 248/443 |
| 7,905,184 | B2 | * | 3/2011 | Eveleth | A47B 3/08 |
| | | | | | 108/115 |

FOREIGN PATENT DOCUMENTS

GB    2 240 918    8/1991

\* cited by examiner

*Primary Examiner* — Monica Millner
(74) *Attorney, Agent, or Firm* — Boyle Fredrickson S.C.

(57) ABSTRACT

A collapsible pedestal is disclosed for use with a pet dish or fountain. The pedestal is made of several releasably attached legs. Preferably, all of the legs are of a substantially identical design. Each leg has a coupling hub that may be a pair of hinged, knuckle connection such that the legs may be freely rotatable. The pedestal can be collapsed into a collapsed condition, which accounts for a lesser volume than when the pedestal is in an operating condition. Additionally, the pedestal may be configured to be inverted such that different cradles can be used, each cradle configured to accommodate a bowl, dish, fountain, or other object of varying shapes or designs. Additional legs can be added to an existing pedestal.

29 Claims, 12 Drawing Sheets

FOLD UP PET BOWL OR FOUNTAIN PEDESTAL

CROSS REFERENCE

This application claims priority in U.S. Provisional Patent Application No. 61/949,635 filed Mar. 7, 2014 under 35 U.S.C. §119(e) which is incorporated by reference herein in its entirety.

FIELD

The present invention is directed to a pedestal, and more particularly to a collapsible pedestal, such as a fold-up pedestal, with a varying number of attachable legs for use in holding an object, such as a pet bowl, water fountain and/or pet feeder, off the ground.

BACKGROUND

Pet food or water bowls often rest directly on the ground. This allows animals to easily access the food or water. As a result, animals will quickly ingest as much food and/or water as possible, which can result in flatulence, vomiting, or bloating. Additionally, animals that quickly ingest their food or water oftentimes will push their bowls around the house such that the bowls get in the way or are misplaced.

It is therefore desirable to have a holder for a bowl that prevents rapid ingestion of food, and prevents animals from pushing and moving the dish as they eat or drink.

SUMMARY

The present invention is directed to a pedestal for a pet bowl or fountain. The pedestal is made of a series of legs that can be releasably attached. In a preferred embodiment, each leg is identical such that various configurations can be made using the same legs.

In the preferred embodiment, each leg has a substantially vertical portion, a substantially horizontal portion, and a connection portion. The substantially vertical portion will rest upon the ground, and in a preferred embodiment will contain a foot with a grip or textured surface to prevent sliding of the pedestal. The substantially vertical portion extends generally upwardly to a desired height that can receive the rim of a bowl or dish. The horizontal portion extends generally horizontally from the vertical portion. The bottom of the bowl or dish can rest upon the horizontal portion. The horizontal portion may have a handle that allows a user to easily grip the leg. At the edge of the horizontal portion opposite the vertical portion, a connection portion extends outwards.

In one embodiment, the pedestal may be of a reversible configuration. This means that the foot portion of the substantially vertical portion may be inverted such that it can receive a pet dish, bowl or fountain. In a preferred embodiment, the underside of the horizontal portion has a different distance from the foot than the distance between the top side of the horizontal portion and the top of the substantially vertical portion. This would allow the pedestal to accommodate animal dishes, bowls or fountains of two different sizes without use of additional pieces.

The legs may have a number of different connection portions. In one embodiment, the legs can have a connection portion with pivots configured for rotary engagement enabling one leg to be engaged with an adjacent leg in a manner that enables relative rotation therebetween. In one such preferred embodiment, each leg has a plurality of knuckles or fingers respectively having detents and detent-receiving receptacles that mate or engage to form a snap fit rotary connection between adjacent legs enabling relative rotation therebetween.

In a preferred embodiment, the connection portion is a hinge. For instance, the connection portion may be a series of interconnecting fingers. In this embodiment, each leg has a first and second set of fingers. The first set of fingers of a first leg will interconnect with the second set of fingers of a second leg. Additional legs may be connected to either the first leg or second leg. When connected, the interconnecting fingers may be rotated about a common axis while maintaining the connection. This allows the legs of the pedestal to be rotated such that the pedestal lays flat without disengaging each of the legs.

In another preferred embodiment, each leg contains a set of first and second knuckles. The knuckles can be co-axial circular barrels. The first hinge knuckles should be of a configuration that will releasably abut the second hinge knuckles. For instance, the first knuckle connection has a plurality of circular barrels that are equally spaced and coaxial. The second hinge knuckle also has a plurality of circular barrels that are also equally spaced and coaxial. The alignment of the spaces of the first knuckle connection is configured such that the barrels of the second knuckle connection securely fit into the space of the first knuckle connection. In one embodiment, the barrels may be slightly bigger than the corresponding spaces such that the first knuckle and second knuckle connections will snap together, and remain frictionally engaged. Alternatively, first knuckle and second knuckle connections may be connected by a pin or bolt that is threaded down through the center of the first and second knuckle connections, which are coaxial. Two connected legs may be rotated about the axis of the connecting knuckles. This allows the pedestal to be collapsed by rotating each leg until each leg lies flat.

In one embodiment, the first and second hinge of a leg are disposed alongside one another and spaced apart from one another.

In a preferred embodiment, the pedestal will be assembled using at least three of the legs oriented about a circle. This will result in a structurally stable pedestal capable of holding a bowl or dish. Additional legs may be added as desired. Although the legs are connected about a common axis, each leg is free to rotate about that axis. Therefore, to install additional legs, the connected legs can be rotated, about the common axis to allow for more room in the circle. With each additional leg added, the angle between adjacent pairs of legs is reduced. Regardless of the number of legs added, the configuration of the pedestal remains circular such that it can receive a bowl or dish. The pieces may be sold together or may be bought individually.

In a preferred embodiment, each leg of an unfolded pedestal assembly is located approximately equidistant to the adjacent legs about a circle. For instance, in a configuration with three legs, when the pedestal is in its fully expanded, un-collapsed or un-folded position or condition, each leg would form an included angle with each adjacent leg with the legs substantially equiangularly spaced apart about a generally common axis. When all of the legs are unfolded, the pivots of each pair of pivotally connected knuckles form a generally triangular, rectangular or circular connection hub defining a generally triangular, rectangular or circular opening that is generally centrally located. In a preferred but exemplary configuration of a pedestal constructed in accordance with the present invention having three legs, the central diameter of the circle about which the knuckles are connected, preferably forming a generally circular hub, is about 0.813 inches±0.1 inches, which can range between 0.75 inches and 0.9 inches.

In a preferred pedestal assembly or configuration with four pedestal legs, each leg would form an included angle of about 90°±5° with an adjacent leg with the legs substantially equiangularly spaced apart about a generally common axis. In a configuration with four legs, the diameter of a generally centrally located circle or the width of a generally centrally located rectangle, e.g., square, formed by the connected knuckles is between 0.75 inches and 1.25 inches and preferably about 1.018 inches±0.1 inch.

In a preferred pedestal assembly or configuration with five pedestal legs, each leg forms an angle of about 72°±4° with each adjacent adjacent leg about a common axis or generally centrally located connection hub when unfolded. In such an unfolded configuration with five legs, the connected knuckles of adjacent legs define a generally circular central connection hub having a generally circular pedestal opening having a diameter of about 1.225 inches±0.25 inches.

In another preferred pedestal assembly or configuration with six pedestal legs, each leg forms an angle of about 60±3° with each adjacent leg about a common axis or generally centrally located connection hub when unfolded. In such an unfolded configuration with six legs, the connected knuckles of adjacent legs define a generally circular central connection hub having a generally circular pedestal opening having a diameter of about 1.440 inches±0.3 inches.

In still another preferred pedestal assembly or configuration with seven pedestal legs, each leg forms an angle of about 51.43±3° with each adjacent leg about a common axis or generally centrally located connection hub when unfolded. In such an unfolded configuration with seven legs, the connected knuckles of adjacent legs define a generally circular central connection hub having a generally circular pedestal opening having a diameter of about 1.659 inches±0.4 inches.

In a further preferred pedestal assembly or configuration with eight pedestal legs, each leg forms an angle of about 45±3° with each adjacent leg about a common axis or generally centrally located connection hub when unfolded. In such an unfolded configuration with eight legs, the connected knuckles of adjacent legs define a generally circular central connection hub having a generally circular pedestal opening having a diameter of about 1.881 inches±0.4 inches.

If desired, any pair of legs can be easily attached or detached from one another. When at least one of the connections between a pair of adjacent legs is removed or the pair of adjacent legs is otherwise disengaged, the remaining legs of the pedestal are collapsible enabling all of the legs of the pedestal to collapse, preferably by being folded up, into a compact design. The various legs can be rotated about the common axis until the plurality of pairs of legs lies flat on one another. This allows for easier and more affordable shipping and transportation, and for easier storage.

In a preferred embodiment, a folding pedestal constructed in accordance with the present invention has at least a plurality of hinges, preferably at least a plurality of pairs of hinges (i.e., at least three hinges), each connected to a plurality of folding pedestal legs with the hinges forming a structurally reinforcing hub upon which an object, such as preferably a bowl, e.g. food or water bowl, or basin, e.g. pet fountain basin, is removably supported. The structurally reinforcing hub preferably is generally centrally disposed in a center of a cradle of the pedestal at least partially formed by the hub with at least a plurality, preferably at least a plurality of pairs, of pedestal legs radially outwardly extending from the hub. The hub is formed by interconnected hinges whose last pair interconnects when the last pair of hinge knuckles are intermeshed and releasably secured together by an elongate pivot pin. Such a hub formed by a plurality, preferably at least a plurality of pairs, of interconnected hinges is tubular providing a torsion and/or force distributing central pedestal structurally rigidifying tube underlying and supporting the object held by the pedestal structurally reinforcing the pedestal by more evenly distributing loads and compressive, tensile, twisting, shear, impact and/or other forces encountered by the pedestal during use and operation. Such a tube can be elongate extending generally downwardly toward a surface, e.g., floor, upon which the pedestal is supported.

In a preferred embodiment, the pedestal can be used with a variety of different pet bowls or dishes. For instance, the pedestal could he used with either dog or cat bowls for water or food. Additionally, the pedestal could be used with water fountains for dogs or eats. Further, the pedestal and the pet bowls or dishes are preferably made of dishwasher-safe materials. This allows a user to easily clean the entire pedestal and the howl or dish assembly.

BRIEF DESCRIPTION OF THE DRAWINGS

One or more preferred exemplary embodiments of the invention are illustrated in the accompanying drawings in which like reference numerals represent like parts throughout and in which:

FIG. 2A is an isometric view of one embodiment of an inventive fold up pedestal with four legs in an upside up position having a first cradle of a shape or contour with a similarly contoured or configured bottom surface ready to receive a bowl, basin or the like;

Figure 1:
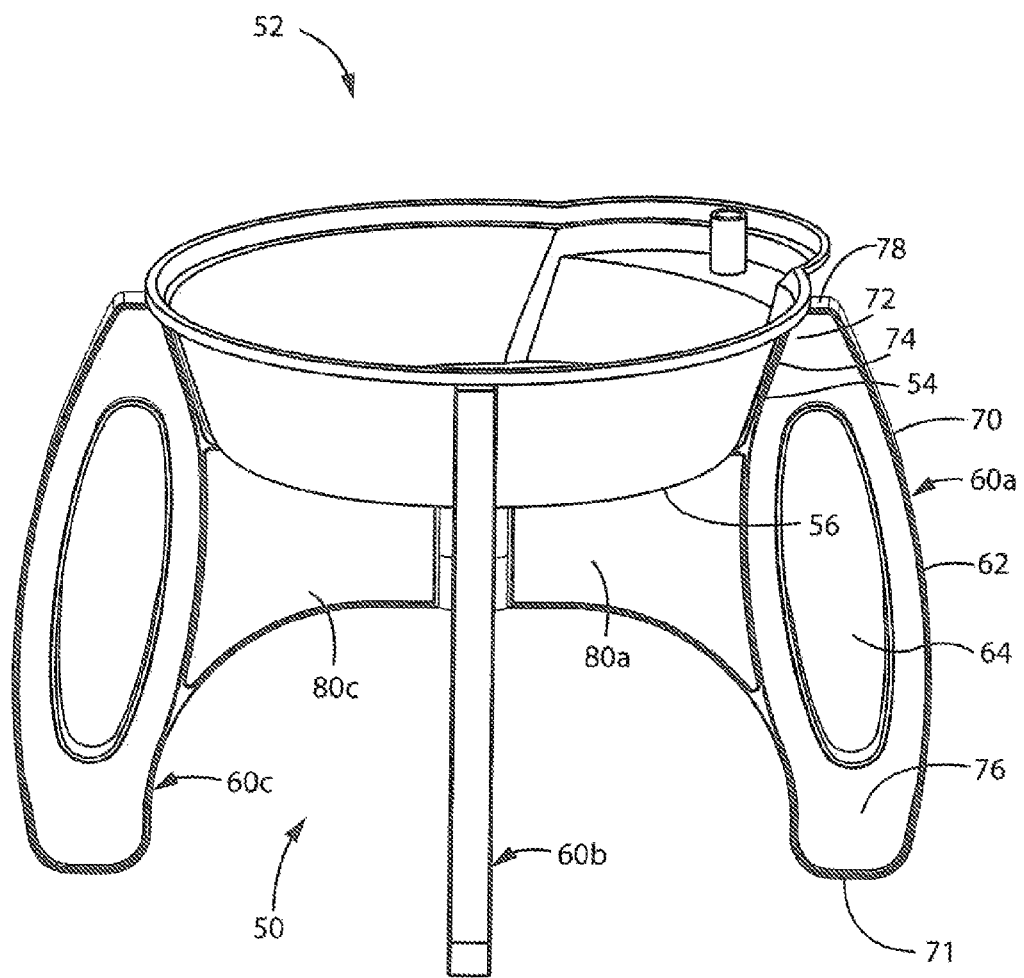
FIG. 1 is an isometric view of an inventive fold up pet bowl or fountain pedestal.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

With regard to FIGS. 1-11, the present invention is directed to a collapsible pedestal 50 that can be and preferably is of fold-up construction that is particularly well suited for use in holding an object, preferably a bowl, e.g., water or food bowl, a fountain or feeder for a pet, such as a dog or cat, or another type of device, apparatus or object configured for pet interaction, particularly where it is desired to space the object above the ground, floor or other generally horizontal surface upon which the pedestal 50 can be placed. In the illustrated embodiment, the object is a bowl-shaped water-holding basin 52 having its cover removed of a recirculating pet fountain, such as of the type disclosed in commonly owned U.S. Pat. No. 8,763,557, the entirety of which is hereby expressly incorporated by reference herein. If desired, the fountain cover Can also be placed on the fountain basin 52 while the basin 52 is cradled and spaced off the ground by the pedestal 50. If desired, the fountain can be operated to recirculate water while the fountain basin 52 is held by or in the pedestal 50. If desired, instead of such a pedestal 50 holding a recirculating pet fountain basin 52, the object held by the pedestal 50 above the floor can be a dog water bowl, a dog food bowl, a cat water bowl, a cat food bowl, a pet water bowl, a pet food bowl, a combination pet water and food bowl arrangement, a pet feeder, an animal water bowl, an animal food holding bowl, an animal feeder or the like.

In a preferred embodiment, a collapsible pedestal 50 constructed in accordance with the present mention spaces a bowl, fountain or feeder for a pet at least one inch and preferably at least one and a half inches above the ground, floor or other generally horizontal surface. In another preferred embodiment, where configured for holding a bowl, fountain or feeder for a dog, the pedestal 50 is constructed to space the dog bowl, dog fountain or dog feeder at least two inches above the ground, floor or other generally horizontal surface.

The collapsible pedestal 50 has a plurality of pedestal legs 60, shown in isolation in FIGS. 3-6 having a generally vertical downwardly extending pedestal foot 70 from which extends a generally horizontally extending pedestal object support 80 upon which a portion of an object, in the illustrated figures a basin 52, is supported or held by the pedestal 50 that is disposed in engagement with the generally horizontally extending pedestal object support 80 of at least one other pedestal leg 60 and preferably a plurality of other pedestal legs 60. In the illustrated embodiment, the generally horizontally extending pedestal object support 80 can and preferably does extend generally perpendicular to the pedestal foot 70.

Figure 2A:
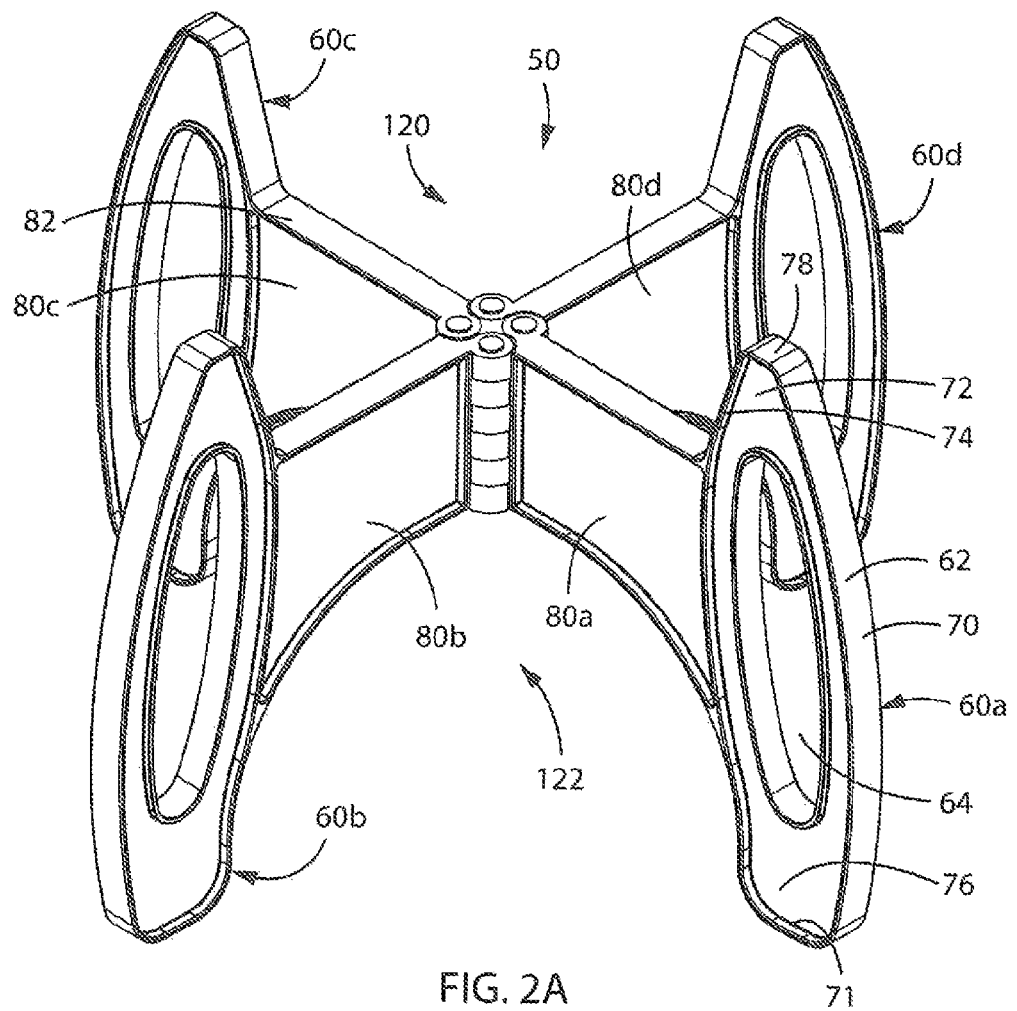
Figure 2B:
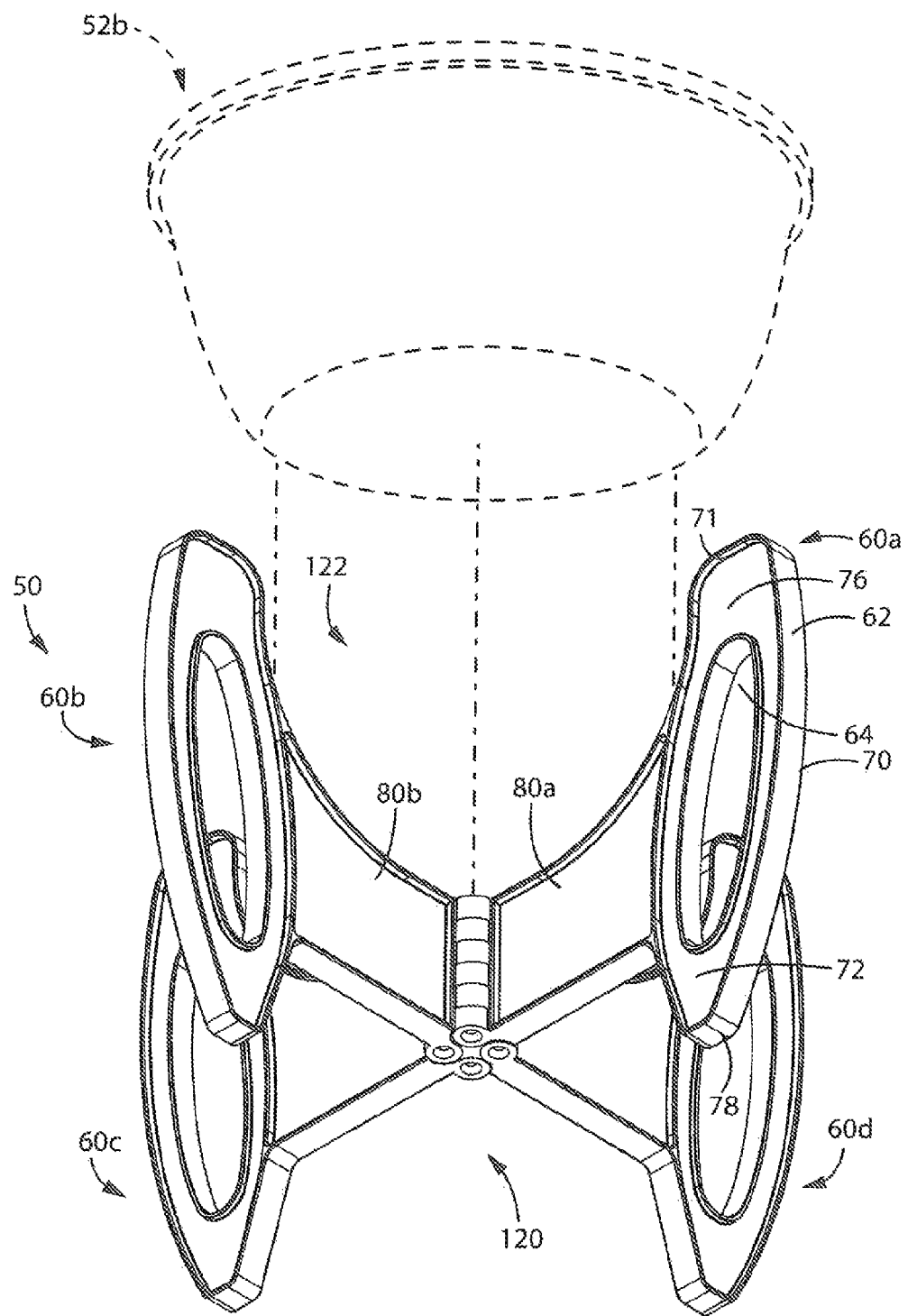
FIG. 2B is an isometric view of one embodiment of the inventive fold up pedestal with four legs in an upside down or reversed position from the upside up position shown in FIG. 2A, having a second cradle of a shape or contour with a similarly contoured or configured bottom surface ready to receive a different sized bowl, basin or the like than the first cradle.
Figure 5:
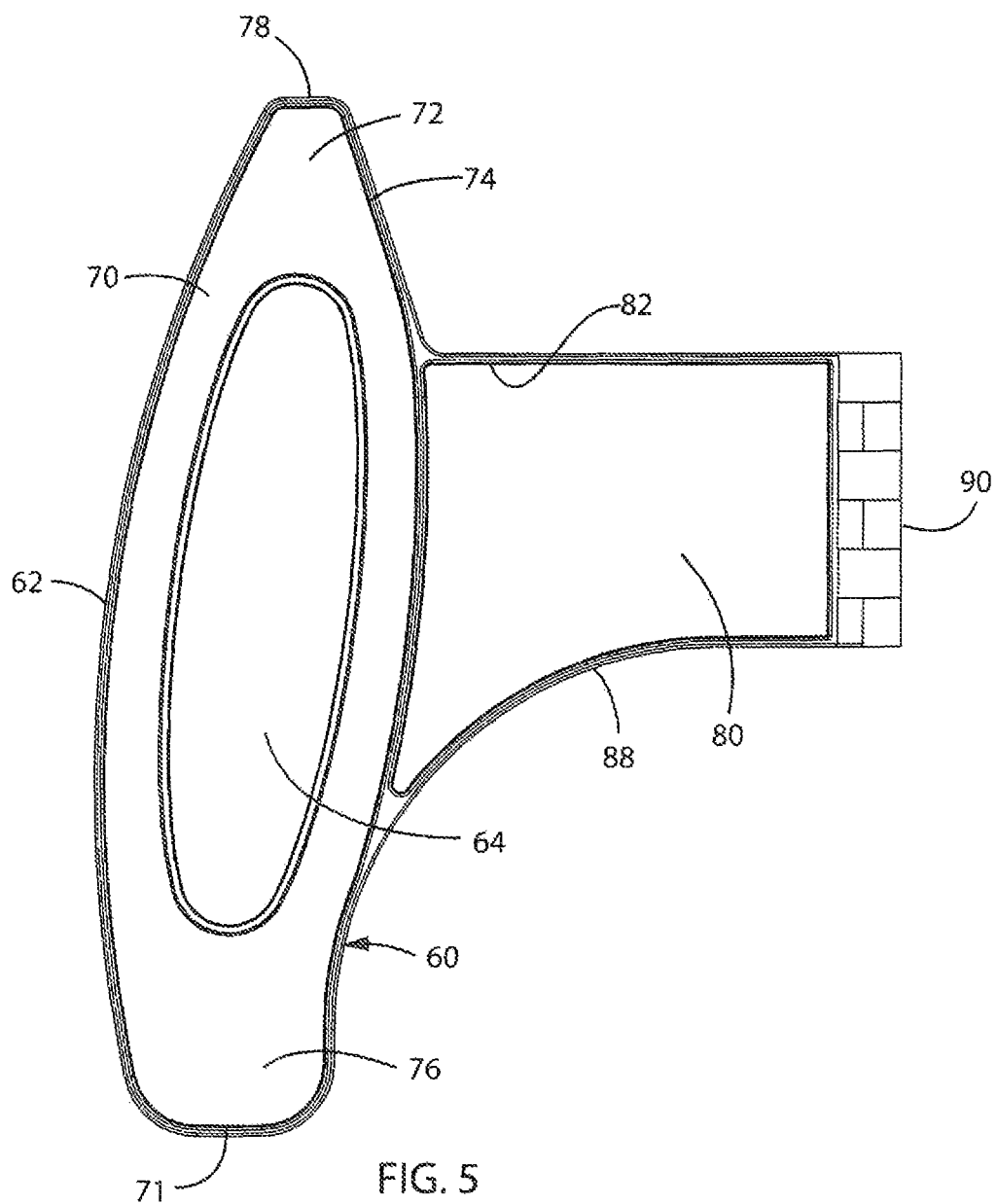
FIG. 5 is a side elevation view of one leg of the inventive fold up pedestal of FIG. 3.
Figure 6:
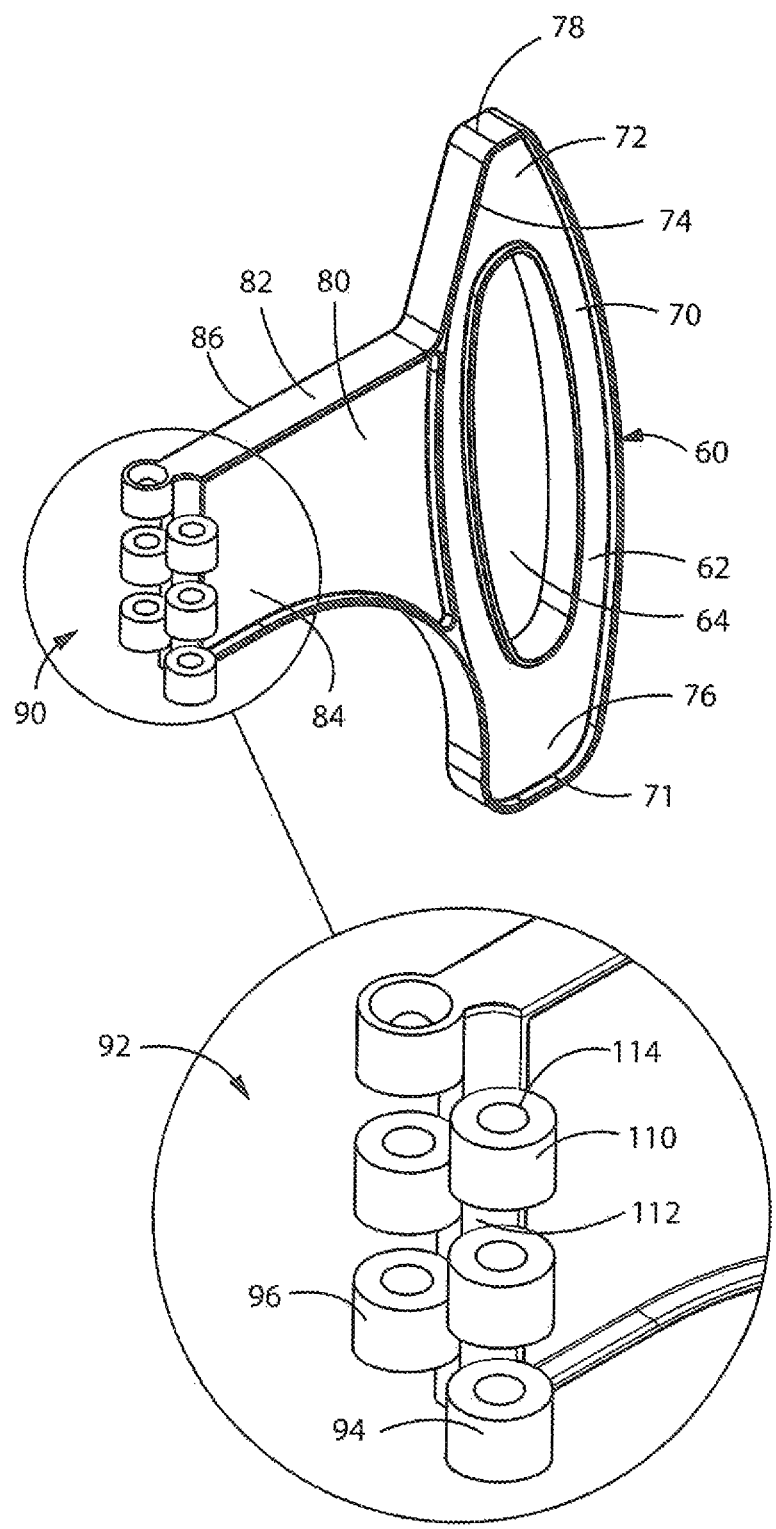
FIG. 6 is an isometric view of the one leg of the inventive fold up pedestal of FIG. 3, with a detail view of the knuckle connection.

Each horizontally extending pedestal object support 80 has, as shown in FIG. 2A, an upwardly facing or first pedestal object support surface 82 and downwardly facing or second pedestal object support surface 88, both of which extend generally horizontally from at or adjacent the pedestal foot 70 towards a free end 90 of the generally horizontally extending pedestal object support 80 that is engaged in the coupling hub 92 disposed generally at the center of the pedestal 50. Referring now to FIGS. 1, 2A, and 2B, in a preferred embodiment, the first and second object support surfaces 82, 88 provide object supporting cradles of different shapes and configurations allowing for holding different bowls, basins, or other objects depending on which end of the pedestal 50 is facing up in the supporting position, as explained in greater detail elsewhere herein. Referring now to FIG. 2A, trusses 80a, 80b, 80c, 80d of the respective pedestal legs 60a, 60b, 60c, 60d interconnect the corresponding upward and downward or first and second object support surfaces 82, 88 to each other, in generally vertically arranged web-like manner. In this way, each truss 80a, 80b, 80c, 80d and its first and second object support surfaces 82, 88 provides an I-beam-type configuration, when viewed in cross section. At least part of an upwardly facing pedestal object support surface 82 of the generally horizontally extending pedestal object support 80 preferably defines a pedestal object support surface upon which at least part of the bottom 56 of the pet basin 52 can rest. Each pedestal leg 60 preferably also has an outer pedestal object abutment, stop or locator 72 spaced outwardly of the coupling hub 92 that preferably is configured to engage part of the object, a basin 52 in the illustrated embodiment, placed on the pedestal 50 such as to limit relative movement therebetween and/or help hold the object substantially in place on the pedestal 50. In a preferred embodiment as shown in FIGS. 5-6, the abutment, stop or locator 72 preferably extends in a direction generally opposite that of the pedestal foot 70 having a generally inwardly facing generally upwardly extending pedestal object seat or seating surface 74 against which part of an object placed on or otherwise held by the pedestal 50 can seat or abut. The downwardly extending pedestal foot 70 extends into a generally downwardly extending pedestal object abutment, stop or locator 76 with a base 71 that rests upon the floor or ground when the pedestal 50 is in an upside up position as seen in FIGS. 1 and 2A. If desired, the base 71 can have a grip or other textured surface to prevent sliding of the base 71 along the floor. On the opposing end of the pedestal foot 70 is a top surface 78 that abuts a portion of the outer surface 54 of the pet basin 52.

In the preferred embodiment shown in the FIG. 1, the generally inwardly facing generally upwardly extending pedestal object seat or seating surface 74 can have a contour or shape generally complementary to at least a portion of an outer surface 54 of the object held by the pedestal 50. If desired, although not shown, the object held by the pedestal 50 can have one or more channels or slots formed in an outer surface thereof that receives at least a portion of the generally inwardly facing generally upwardly extending pedestal object seat or seating surface 74 of at least one of the pedestal legs 60 thereby preventing relative rotation between the object held by the pedestal 50.

Figure 7A:
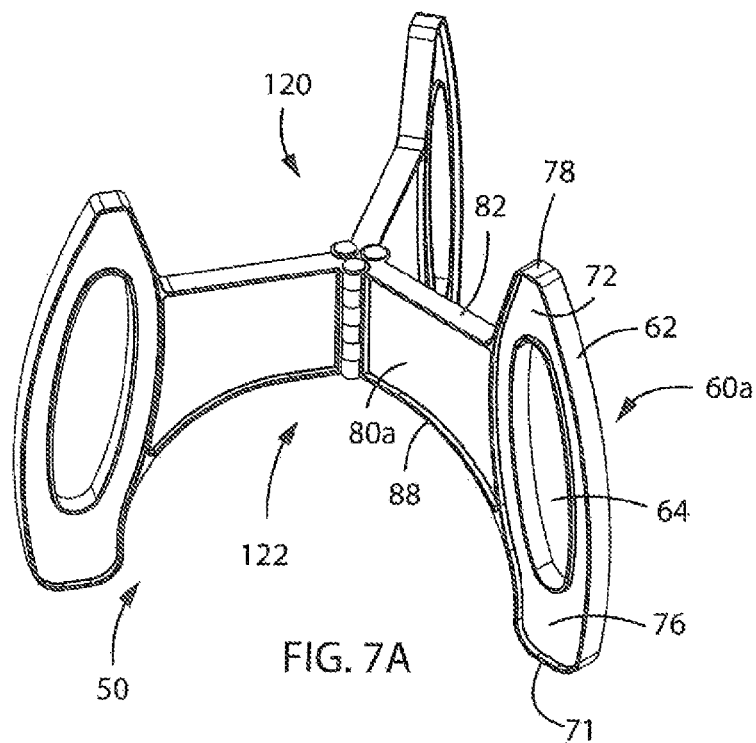
FIG. 7A is an isometric view of one embodiment of an inventive fold up pedestal with three legs in an upside up position.
Figure 7B:
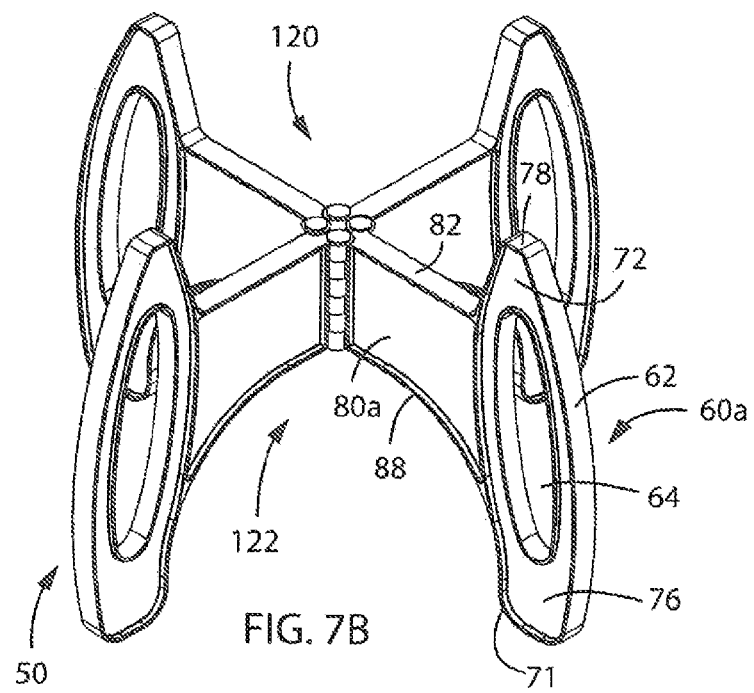
FIG. 7B is an isometric view of one embodiment of an inventive fold up pedestal with four legs in an upside up position.
Figure 7C:
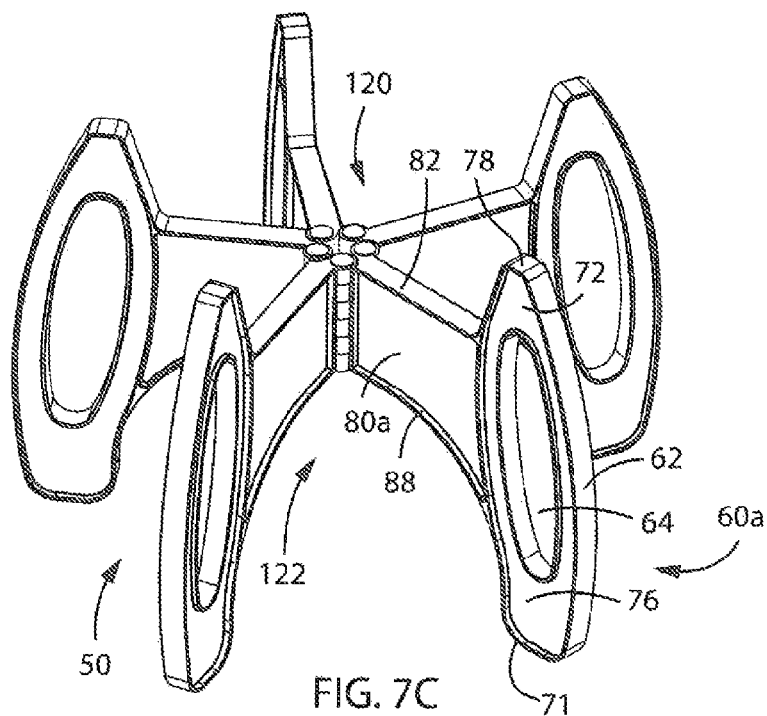
FIG. 7C is an isometric view of one embodiment of an inventive fold up pedestal with five legs in an upside up position.
Figure 7D:
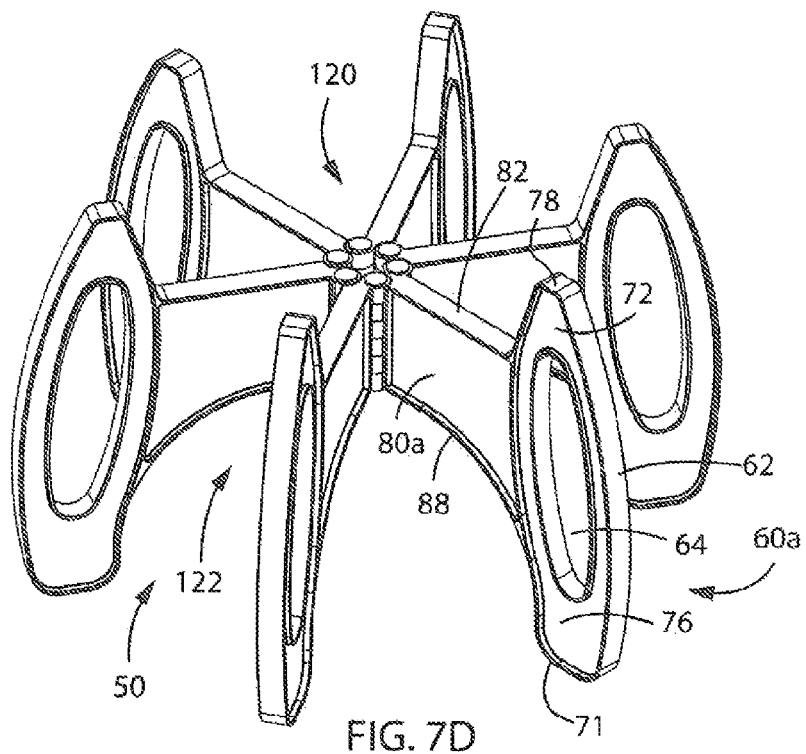
FIG. 7D is an isometric view of one embodiment of an inventive fold up pedestal with six legs in an upside up position.
Figure 7E:
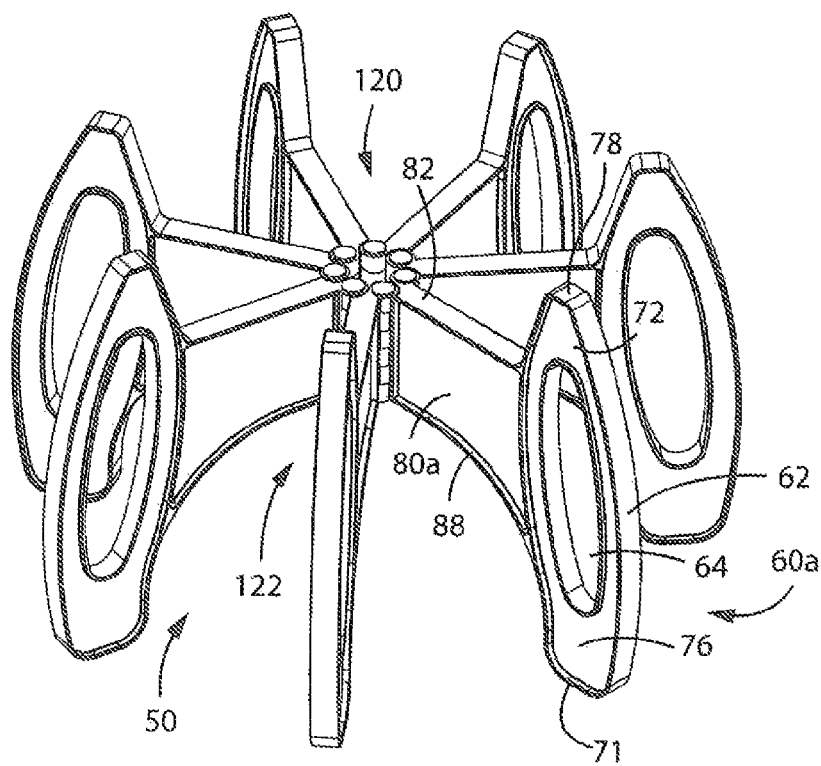
FIG. 7E is an isometric view of one embodiment of an inventive fold up pedestal with seven legs in an upside up position.
Figure 7F:
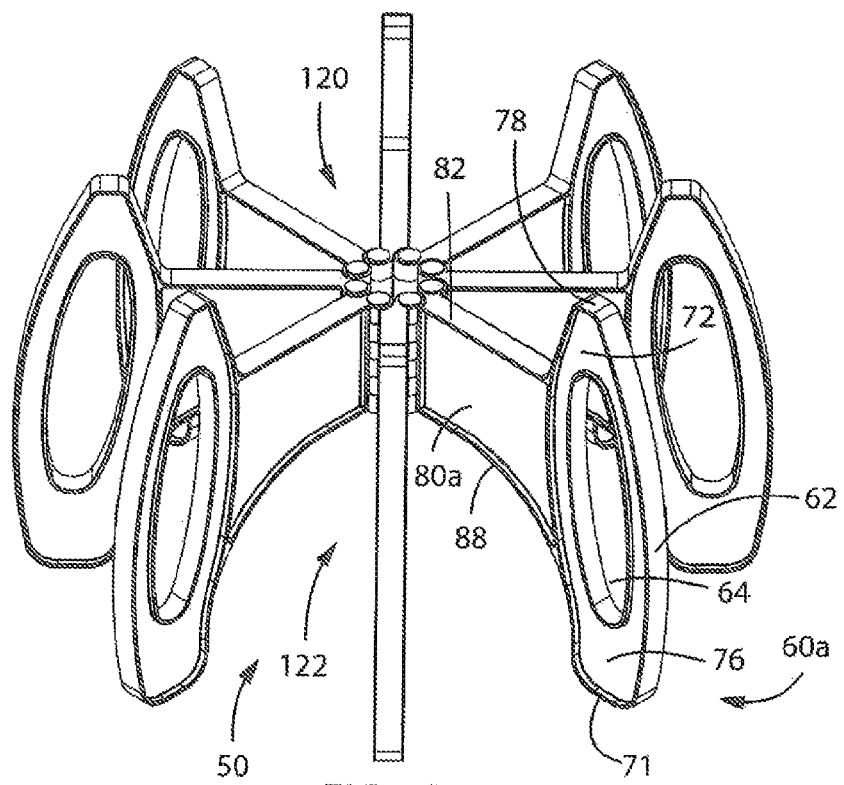
FIG. 7F is an isometric view of one embodiment of an inventive fold up pedestal with eight legs in an upside up position.
Figure 8:
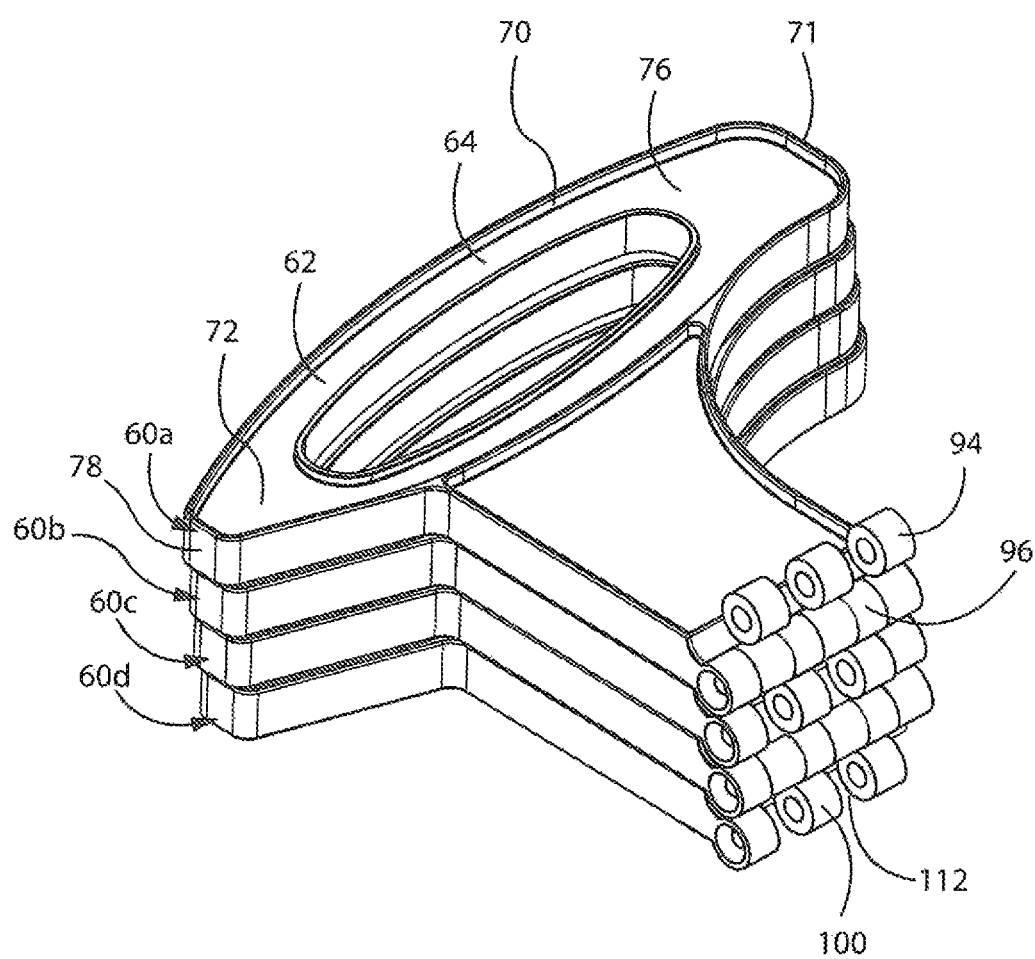
FIG. 8 is an isometric view of one embodiment of the inventive told up pedestal with four legs, where the pedestal is collapsed.

If desired, one or more of the pedestal legs 60 can be three dimensionally contoured to provide a handle 62 that can be grasped by a user, including when collapsed, to enable the pedestal 50 to be moved. In one preferred embodiment, at least one of the pedestal legs 60 has an opening that can be elongate and/or oblong, e.g., generally oval, that forms a handle opening 64 enabling part of a hand of a user to be inserted through the handle opening 64 and wrapped around part of the pedestal foot 70 and/or generally downwardly extending pedestal object abutment, stop or locator 76 when grasping the handle 62. In one such preferred embodiment, each pedestal leg 60 includes such a handle opening 64 enabling any one of the legs 60 of the pedestal 50 to be grasped when un-collapsed, for instance as depicted in FIGS. 7A-7F and all of the legs 60 to be grasped when collapsed such as depicted in FIG. 8.

Each leg 60 also has a coupling hub 92 integrally formed of the edge of a free end 90 of the generally horizontally extending pedestal object support 80, as can best be seen in FIG. 6. The coupling hub 92 allows a plurality of legs, 60a, 60b, 60c, and 60d, to be pivotally attached to one another and can be pivotally releasably attached to one another if desired, as illustrated in FIGS. 8-11. In the illustrated embodiment, the coupling hub 92 of one leg 60 includes first and second hinge knuckles 94 and 96 that each respectively engage a corresponding one of the first and second hinge knuckles 94 and 96 forming a first and second pivot or pivot hinge 100 and 102. As shown, the pivot hinges 100, 102 are formed when a pivot pin 104 and 106 extends therebetween.

Figures 3, 4:
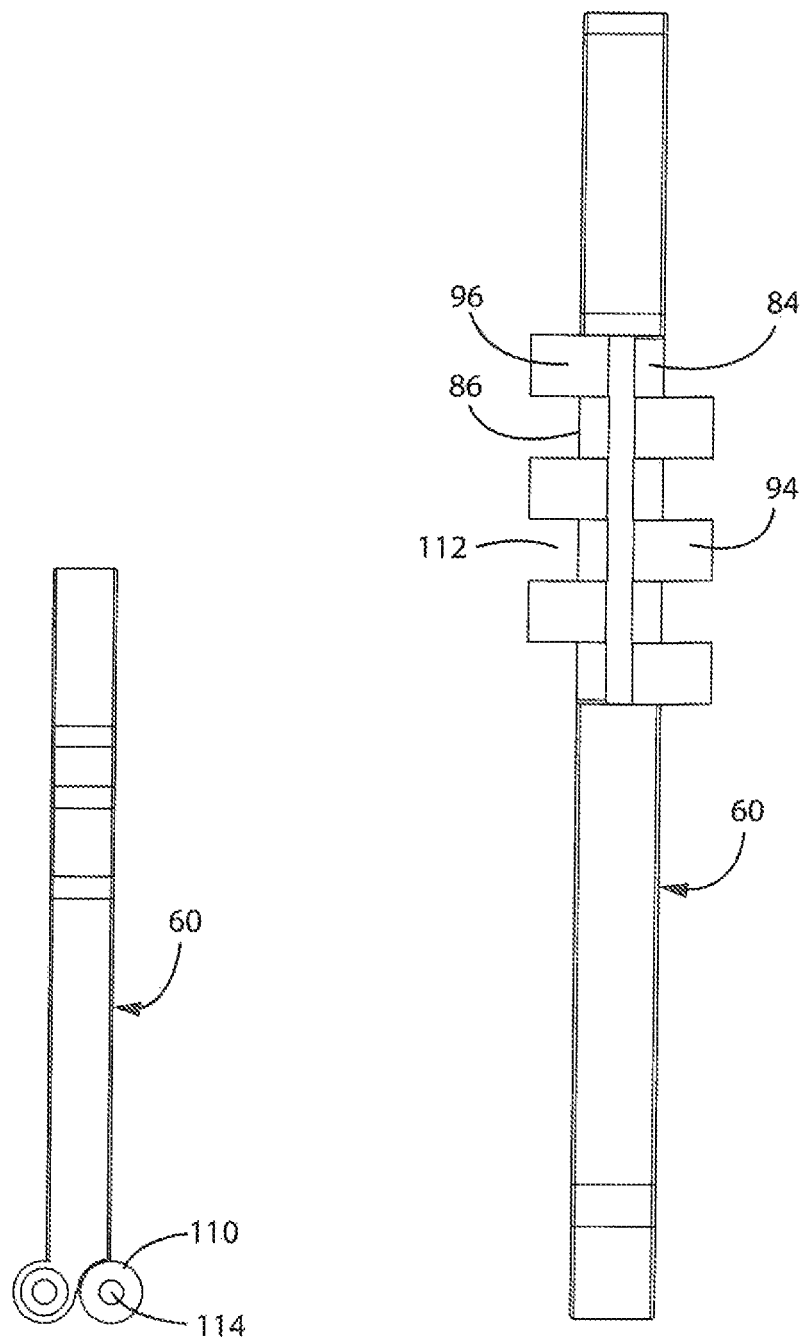
FIG. 3 is a top plan view of one leg of the inventive fold up pedestal.
FIG. 4 is a front elevation view of one leg of the inventive fold up pedestal of FIG. 3.

Looking generally to FIGS. 4 and 6, each set of first and second hinge knuckles 94 and 96 is formed of a plurality of hinge knuckle barrels 110 with one of the first and second hinge knuckles 94 and 96 being disposed alongside one another, generally parallel to one another, and axially offset so as to stagger the hinge knuckle barrels 110 of one of the first and second hinge knuckles 94 and 96 relative to the hinge knuckle barrels 110 of the other one of the first and second hinge knuckles 94 and 96. The hinge knuckle barrels 110 of the first hinge knuckle 94 of one leg 60b are alternately staggered and spaced apart in a manner that enables the hinge knuckle barrels 110 of the second hinge knuckle 96 of an adjacent leg 60a on one side of the leg 60a to be received therebetween when pivotally coupled to one another during pedestal 50 assembly. Conversely, the hinge knuckle barrels 110 of the second hinge knuckle 96 of the leg 60b are alternately staggered and spaced apart in a manner that enables the hinge knuckle barrels 110 of the first hinge knuckle 94 of an adjacent leg 60c on the other side of the leg 60b to be received therebetween when pivotally coupled to one another during pedestal 50 assembly. Once engaged, the first hinge knuckle 94 and the second hinge knuckle 96 may pivot about a common pivot axis. A pivot pin 104, such as an elongate pin or even a threaded bolt can be inserted into and through the intermeshed and/or interlocked hinge knuckle barrels 110 that define the pivot axes of each pair of mated first and second hinge knuckles 94 and 96 during pivotal attachment of one pedestal leg 60a to an adjacent pedestal leg 60b. In one embodiment, in a resting collapsed state of the pedestal 50, multiple or all but one of the respective knuckles 94, 96 of adjacent pedestal legs 60a, 60b, 60c, 60d are connected to each in a preassembled multiple-joint arrangement that allows for angular or pivot-style collapsing folding of the legs 60a, 60b, 60c, 60d across each other in a stacked collapsed storage position, with a single pair of disconnected knuckles 94, 96 of a correspond disconnected pair of legs 60a, 60b, 60c, 60d. remaining free or disconnected with respect to each other. To assemble the pedestal 50, the legs 60a, 60b, 60c, 60d are pivoted or fanned-out about the pre-assembled knuckles 94, 96 until the free or last knuckles 94, 96 are brought into coaxial alignment with each other. The free or disconnected pair of respective knuckles 94, 96, as the last pair of hinge knuckles 94, 96 to be connected, is then attached to each other with a single pivot pin 104 to arrive at the assembled form of the pedestal 50.

The first knuckles 94 are located on one side 84 of generally horizontally extending pedestal object support 80 of the leg 60 while the second knuckles 96 are located on an opposite side 86 of the generally horizontally extending pedestal object support 80 of the leg 60, as can be seen in FIG. 6. Both sets of knuckles 94, 96 have a plurality of substantially coaxial circular barrels 110. In the illustrated embodiment, the center of the knuckles 94, 96 are located generally in line with a corresponding edge of the leg 60. Each pair of adjacent barrels 110 has a corresponding space 112 therebetween large enough to receive a knuckle barrel 110 of a knuckle 94, 96 of an adjacent leg 60. This configuration allows the barrels 110 of the first knuckle 94 to be received within corresponding spaces 112 of the second knuckle 96. Similarly, the barrels 110 of the second knuckle 96 can be received within corresponding spaces 112 of the first knuckle 94.

In the illustrated embodiment, each of the coaxial circular hinge knuckle barrels 110 has a concentric bore, shown as a throughbore or hole 114, as can be seen in FIG. 4, through which an elongate pivot pin 104 can be inserted. For instance, the pivot may be a fastener, such as a locking pin or bolt, which can be threaded if desired. Alternatively, the coaxial circular hinge knuckle barrels 110 may be configured to have a snap fit configuration. In such a configuration, the coaxial circular in cross-section or cylindrical hinge knuckle barrels 110 may be dimensioned to be slightly larger than the corresponding spaces 112 to encourage a tight-fitting connection that preferably is of snap-fit pivoting construction.

Figure 9:
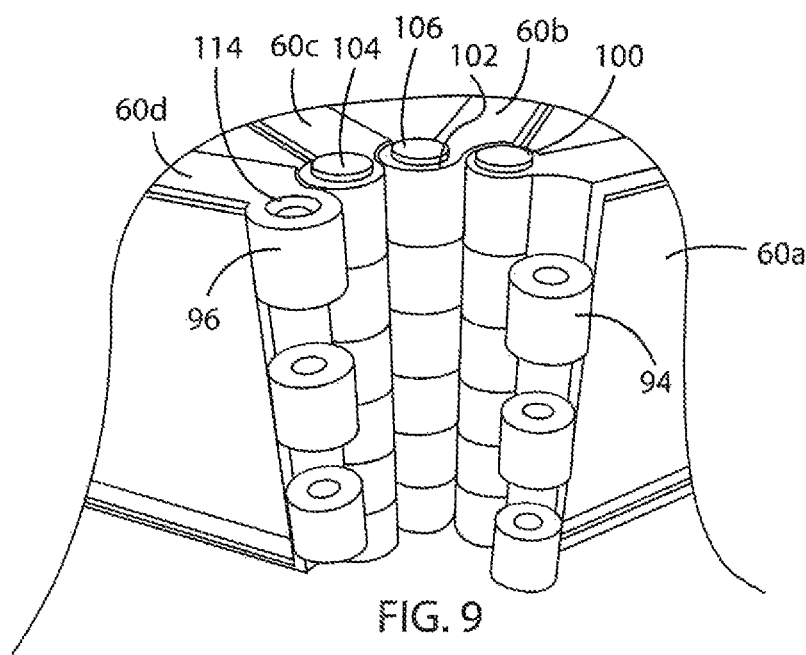
FIG. 9 is a detailed isometric view of the pedestal of FIG. 8 showing a number of the knuckle connections when one of the knuckle connections has been disconnected.
Figure 10:
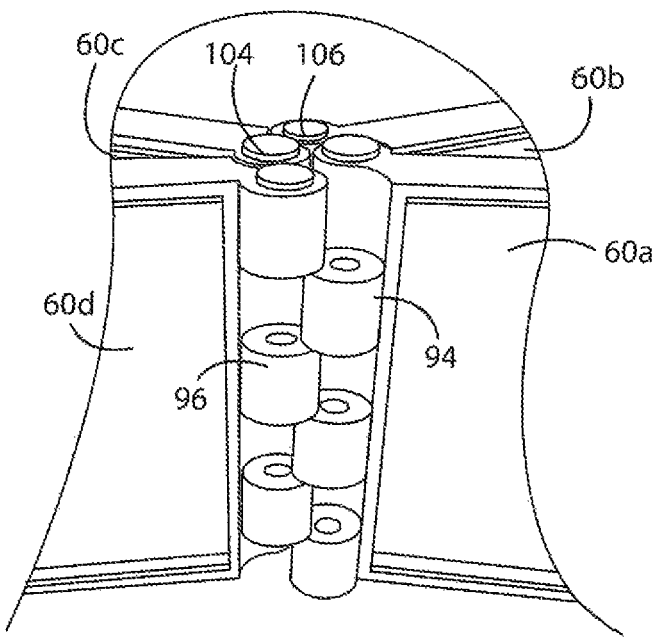
FIG. 10 is a detailed isometric view of two knuckle connections as they become intertwined.
Figure 11:
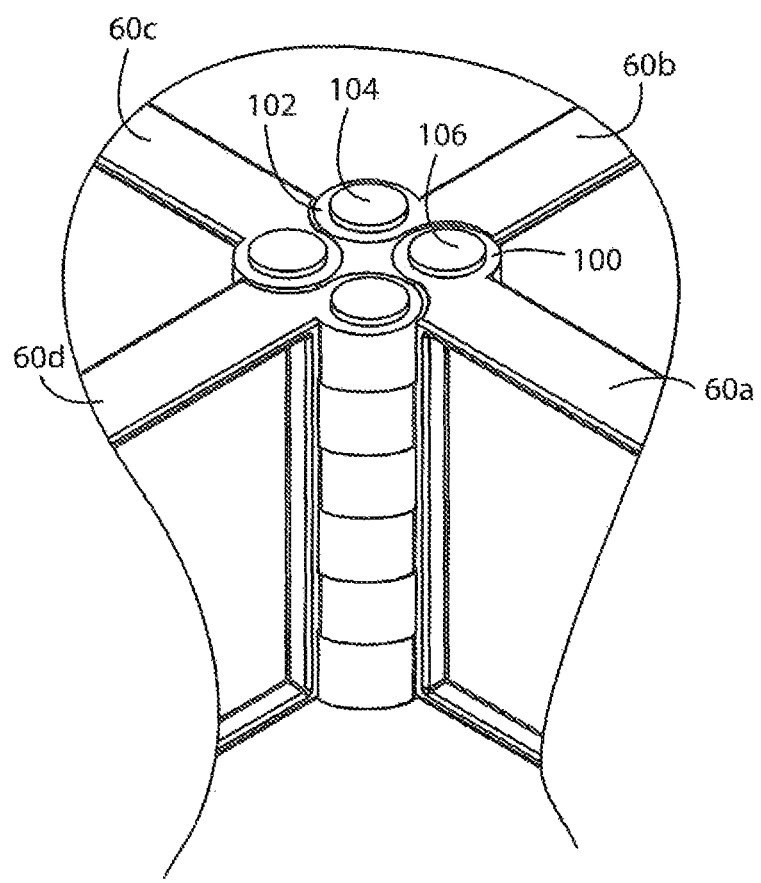
FIG. 11 is a detailed view of the inventive pedestal once the two knuckle connections from FIG. 10 are intertwined such that the inventive pedestal is in an operating condition.

Once the connection between the first knuckle 94 and the second knuckle 96 has been made, the two legs 60a, 60b may rotate about the common axis of the first knuckle 94 and second knuckle 96. This is best seen by reviewing FIGS. 8-11 in sequence, which illustrates a configuration with four legs 60a, 60b, 60c, and 60d. The knuckles 94, 96 respectively form a pair of pivot hinges 100, 102 pivotally connected to one another defining a pivot about which the pair of legs, i.e. 60a, 60d, may rotate. This allows for free rotation about the common pivot axes. Adjacent legs can be rotated until die angle between the corresponding knuckles 94, 96 reaches zero. This would result in adjacent legs 60 being completely flat, shown in FIG. 8, such as when the pedestal 50 is in a collapsed condition. When a user wishes to use the pedestal 50, the legs 60 can be rotated from the collapsed condition towards the operation condition, as seen in FIGS. 9-10. Once the knuckles 94 of the first leg 60a and the knuckles 96 of the second leg 60d overlap, as seen in FIG. 11, the connection can be secured and the pedestal 50 will again be in operating condition.

The same methodology could be used with pedestals 50 formed of a different number of legs as will be appreciated looking to FIGS. 7A-7F. For instance, when the first leg 60a and the second leg 60d are disengaged, additional legs 60 may also be installed by engaging first 94 and second knuckles 96 of the new leg 60 with knuckles 94, 96 of existing legs 60*a*, 60*d*. Each of these pedestals 50 are formed of pedestal legs 60 each having a generally horizontally extending pedestal object support 80 with a coupling hub 92 that is disposed in engagement with the coupling hub 92 of a generally horizontally extending pedestal object support 80 of at least a plurality of other pedestal legs 60. FIGS. 7A-7F illustrate several different possible configurations of the pedestal 50, for instance a pedestal 50 constructed of three pedestal legs, four pedestal legs, five pedestal legs, six pedestal legs, seven pedestal legs, and eight pedestal legs. As each pedestal leg 60 has substantially the same construction, additional pedestal legs 60 may be added to the pedestal 50 based on the desire of the user. This results in a customizable pedestal 50 with varying numbers of legs 60.

As discussed above, the generally horizontally extending pedestal object support 80 of each pedestal leg 60 has a free end 90 of the generally horizontally extending pedestal object support 80. The free end 90 converges to a coupling hub 92 that is generally centrally located that also is constructed and arranged to enable the pedestal 50 to be collapsed into a collapsed condition, which is a more compact form where a plurality of the pedestal legs, i.e. 60*a*, 60*b*, 60*c*, 60*d*, can be stacked on top of one another or overlie one another, such as depicted in FIG. 8. When collapsed into a more compact form, it enables a pedestal 50 to occupy a volume of less than half of its un-collapsed or operating form shown in FIGS. 7A-7F. This advantageously enables the pedestal 50 to be packaged in a collapsed form in a package of reduced volume that in turn advantageously reduces shipping charges as well as the amount of retail shelf space taken in a store when displayed for retail sale. It also enables such a collapsible pedestal 50 to be shipped in a collapsed form together with an object intended to be placed on the pedestal 50, for instance a pet basin 52 as shown.

Furthermore, the assembled coupling hub 92 provides an intermediate force distribution ring between the pedestal legs, i.e. 60*a*, 60*b*, 60*c*, 60*d* that provides structural integrity and rigidity to the pedestal 50. The coupling hub 92 from which pedestal legs 60*a*, 60*b*, 60*c*, 60*d* outwardly radiate when the pedestal 50 is unfolded is tubular and therefore provides structural rigidity to the pedestal. Structural rigidity is provided particularly to the hinge region at the interlocking hinge knuckles 94, 96, helping to resist flexing and twisting of pedestal legs and/or one or more of the hinges. By the hinges being interconnected to form the hub 92, the hub 92 also functions as a force spreader that helps more uniformly distribute tensile, compressive, twisting and shear forces encountered by one or more of the hinges including from forces transmitted through one or more of the hinges encountered by one or more of the pedestal legs. The cooperative pair of hinge knuckles 94, 96 at each leg 60*a*, 60*b*, 60*c*, 60*d* facilitates spreading of forces by simultaneously dividing and transmitting forces transmitted from any force inputted into the hub 92 from the respective each leg 60*a*, 60*b*, 60*c*, 60*d* into multiple force components such as compressive, torsional, and tensile components through the hub 92 in multiple directions through the hub. In one embodiment, a force at one of the legs 60*a*, 60*b*, 60*c*, 60*d* that provides a pushing compressive force through one of the hinge knuckles 94, 96 in a first direction through the hub 92 will at the same time provide a pulling tensile force through the other one of the hinge knuckles 94, 96 relative to that particular leg 60*a*, 60*b*, 60*c*, 60*d*. Thus the central hub 92 provides a tubular, hexagonal, or other polygonal, box-like central hub in a direction parallel to the pivot pins 104 that helps stiffen the hub 92, strengthening the overall pedestal 50. By interconnecting the hinges during unfolding when the pivot pin is inserted into the last pair of intermeshing hinge knuckles to form the hub, a force or moment encountered by one hinge is transmitted and preferably relatively evenly distributed between the adjacent pair of hinges connected to the one hinge.

In one preferred embodiment, at each of the legs 60*a*, 60*b*, 60*c*, 60*d*, the hinge knuckles 94, 96 positions relative to each other allows for the interconnection with the cooperating hinge knuckles 94, 96 at the adjacent pair of legs 60*a*, 60*b*, 60*c*, 60*d* to provide the multi-directional force spreading and transferring ring of the hub 92. In a preferred embodiment, the pedestal 50 will be assembled using at least three of the legs 60*a*, 60*b*, 60*c*, 60*d* oriented about a circle. This will result in a structurally stable pedestal capable of holding a bowl or dish. Additional legs may be added as desired. Although the legs are connected about a common axis, each leg is free to rotate about that axis. Therefore, to install additional legs, the connected legs can be rotated about the common axis to allow for more room in the circle. With each additional leg added, the angle between adjacent pairs of legs is reduced. In preferred embodiments, respective adjacent pairs of legs are substantially equally angularly spaced from each other. Regardless of the number of legs added, the configuration of the pedestal remains circular such that it can receive a bowl or dish. The pieces may be sold together or may be bought individually.

In a preferred embodiment, each leg 60*a*, 60*b* 60*c*, 60*d* of an unfolded pedestal assembly 50 is located approximately equidistant to the adjacent legs 60*a*, 60*b*, 60*c*, 60*d* about a circle. For instance, in a configuration with three legs 60*a*, 60*b*, 60*c*, 60*d*, when the pedestal 50 is in its fully expanded, un-collapsed or un-folded position or condition, each leg 60*a*, 60*b*, 60*c*, 60*d* would form an angle of between about 95° to about 150° with an adjacent leg, which may depend on the particular angle(s) between other adjacent pair of legs 60*a*, 60*b*, 60*c*, 60*d* of the collapsible pedestal 50. Preferably when the pedestal 50 is in its filly expanded, un-collapsed or un-folded position or condition, each leg 60*a*, 60*b*, 60*c*, 60*d* would form an angle of approximately 120°±5° with each adjacent leg with the legs substantially equiangularly spaced apart about a generally common axis. When all of the legs 60*a*, 60*b*, 60*c*, 60*d* are unfolded, the pivots of each pair of pivotally connected knuckles 94, 96 form a generally triangular, rectangular or circular connection hub 92 defining, a generally triangular, rectangular or circular opening that is generally centrally located. In a configuration with three legs 60*a*, 60*b*, 60*c* the central diameter of the circle about which the knuckles are connected, for example a circle that intersects, inscribes, or circumscribes axes of the knuckles is between about 0.5 inch and about 1.0 inch, preferably is about 0.813 inch±0.1 inch, which can range between 0.75 inch and 0.9 inch.

In a preferred pedestal assembly 50 or configuration with four pedestal legs 60*a*, 60*b*, 60*c*, 60*d*, respective pairs of legs 60*a*, 60*b*, 60*c*, 60*d* define angles of between about 70° and 110°. More preferably, each leg 60*a*, 60*b*, 60*c*, 60*d* would form an included angle of about 90°±5° with an adjacent leg with the legs substantially equiangularly spaced apart about a generally common axis, In a configuration with four legs, the diameter of a generally centrally located circle or the width of a generally centrally located rectangle, e.g., square, formed by the connected knuckles is between about 0.5 inch and 1.5 inches, preferably between about 0.75 inch and 1.25 inches and more preferably about 1.018 inches±0.1 inch.

In a preferred pedestal assembly 50 or configuration with five pedestal legs 60a, 60b, 60c, 60d, respective pairs of legs define angles of between about 60° and 100°. More preferably, each leg forms an angle of about 72°±4° with each adjacent adjacent leg about a common axis or generally centrally located connection hub when unfolded. In such an unfolded configuration with five legs 60a, 60b, 60c, 60d, the connected knuckles 94, 96 of adjacent legs define a generally circular central connection hub having a generally circular pedestal opening provided concentrically inward of the generally circular central connection hub 92 having a diameter of between about 0.8 inch and 1.5 inches and more preferably about 1.225 inches±0.25 inches.

In another preferred pedestal assembly 50 or configuration with six pedestal legs 60a, 60b, 60c, 60d, respective pairs of legs define angles of between about 50° and 90°. More preferably, each leg forms an angle of about 60±3° with each adjacent leg about a common axis or generally centrally located connection hub when unfolded. In such an unfolded configuration with six legs, the connected knuckles of adjacent legs define a generally circular central connection hub 92 having a generally circular pedestal opening provided concentrically inward of the generally circular central connection hub having a diameter of between about 1 inch and 1.7 inches and more preferably about 1.440 inches±0.3 inches.

In still another preferred pedestal assembly 50 or configuration with seven pedestal legs 60a, 60b, 60c, 60d, respective pairs of legs define angles of between about 40° and 80°. More preferably, each leg forms an angle of about 51.43±3° with each adjacent leg about a common axis or generally centrally located connection hub when unfolded. In such an unfolded configuration with seven legs, the connected knuckles of adjacent legs define a generally circular central connection hub having a generally circular pedestal opening provided concentrically inward of the generally circular central connection hub 92 having a diameter of between about 1.2 inches and 2 inches and more preferably about 1.659 inches±0.4 inches.

In a further preferred pedestal assembly 50 or configuration with eight pedestal legs 60a, 60b, 60c, 60d, respective pairs of legs define angles of between about 30° and 70°. More preferably, each leg forms an angle of about 45±3° with each adjacent leg about a common axis or generally centrally located connection hub when unfolded. In such an unfolded configuration with eight legs, the connected knuckles of adjacent legs define a generally circular central connection hub having a generally circular pedestal opening provided concentrically inward of the generally circular central connection hub 92 having a diameter of between about 1.4 inches and 2.5 inches and more preferably about 1.881 inches±0.4 inches.

In one embodiment, the hinge knuckles 94, 96 are sized to allow full collapse of the pedestal 50 in which respective adjacent pairs legs 60a, 60b, 60c, 60d are stacked in face-to-face full surface contacting abutments, with legs 60a, 60b, 60c, 60d defining the free ends at the top and bottom of the stack to be joined to each other when assembling the pedestal 50. In a preferred embodiment, the knuckle barrel 110 radius is for example, between about 0.2 inch and about 1.0 inch, more preferably about 0.25 inch±0.05 inch. In one preferred embodiment, the diameter of the hole or bore of each knuckle has a radius of between about 0.05 inch and about 0.5 inch, more preferably about 0.098 inch±0.08 inch. In one preferred embodiment, the first and second hinge of a leg 60a, 60b, 60c, 60d are disposed alongside one another and have axes spaced apart by a distance between about 0.5 inch and about 1 inch, more preferably about 0.720 inch±inch or about 0.700 inch±0.25 inch.

Another feature of the pedestal 50 is that it can be constructed to be compatible with multiple bowls, dishes, or other objects. Where the pedestal 50 is equipped with the pedestal object abutment, stop or locator 72 that extends upwardly and a generally inwardly facing generally upwardly extending pedestal object seat or seating surface 74, a pedestal object cradle 120 is formed that extends from the generally inwardly facing generally upwardly extending pedestal object seat or seating surface 74 of one pedestal leg 60a to the generally inwardly facing generally upwardly extending pedestal object seat or seating surface 74 of another pedestal leg 60b extending generally oppositely from the one pedestal leg 60a when the pedestal 50 is in an un-collapsed or operating condition. In this position, the generally downwardly extending pedestal object abutment, stop or locator 76 faces downwardly toward the ground, floor or other generally horizontal support surface upon which the pedestal 50 rests or is supported. In this regard, FIGS. 1 and 2A shows the pedestal 50 in an upside up orientation with the pedestal 50 shown in FIG. 1 receiving a first pet bowl or pet fountain that is seated in a first cradle 120 formed by the pedestal legs 60a, 60b, 60c, 60d in a manner that not only spaces the pet bowl or pet fountain at least one inch above the floor minimizing and preferably substantially completely preventing side-to-side movement of the pet bowl or pet fountain relative to the pedestal 50.

In at least one of the pedestal 50 embodiments shown in the drawing figures, such a cradle 120 preferably also includes at least a portion of the generally horizontally extending pedestal object support surface 82 of the one pedestal leg 60a as well as at least a portion of the generally horizontally extending pedestal object support surface 82 of the other generally oppositely disposed or extending pedestal leg 60b. Where the pedestal 50 is formed of at least a plurality of pairs, i.e., at least three, pedestal legs 60a, 60b, 60c as shown in FIG. 7A, such a cradle 120 can be thusly formed of each pair of generally oppositely disposed or oppositely extending pedestal legs 60a, 60b, 60c. If desired, such a cradle 120 can be formed of a plurality of pairs or more of the pedestal legs 60 when the pedestal 50 is disposed in it un-collapsed or operating condition, as seen in FIGS. 7B-7F.

When the pedestal 50 is inverted to an upside down orientation, as can be seen in FIG. 2B, a second cradle 122 is formed with a different three-dimensional configuration than the first cradle 120 enabling the pedestal to hold a different object (not shown) that has a three dimensional outer shape different than the first pet bowl or pet fountain shown in FIG. 1. The second cradle 122 is formed primarily by the generally downwardly extending pedestal object abutment, stop or locator 76 and the downwardly facing pedestal object support surface 88.

Due to this configuration of the pedestal legs 60, the pedestal 50 has a first cradle 120 when disposed in an upside up orientation that is three dimensionally configured to hold a first pet bowl, pet fountain or pet feeder having a first three dimensionally contoured bottom and side(s), as can best be seen in FIGS. 1 and 2A, and has a second cradle 122 when disposed in an upside. down orientation that is three dimensionally configured to hold a second pet bowl, pet fountain or pet feeder having a second three dimensionally contoured bottom and side(s) that is different than that of the first pet bowl, pet fountain or pet feeder, as can best be seen in FIG. 2B. Thus the pedestal 50 can be inverted or is a reversible pedestal 50 to closely hold and locate bowls or other objects of different configurations. The first cradle 120 of the reversible pedestal 50 is configured to receive and concentrically or otherwise locate a first object such as a first bowl 52 having one three dimensionally contoured bottom and sidewall configuration and (FIG. 1). The second cradle 122, opposite the first cradle 120, is configured to receive and concentrically or otherwise locate a second object such as a second bowl 52*b* having another three dimensionally contoured bottom and sidewall configuration (FIG. 2B) that is different than the three dimensionally contoured bottom and sidewall configuration of the first bowl 52.

The pedestal legs 60 may be made of any number of durable materials, including for instance plastic. In a preferred embodiment, the legs 60 are made of dishwasher-safe material. Any additional components, such as pivot pins 104, 106 should also he made of materials that will not he damaged in a dishwasher. As a result, the pedestal 50 may be collapsed into the collapsed orientation, and placed into the dishwasher. This allows for easy and efficient cleaning of the pedestal 50. Additionally, the basin 52 is also made of a dishwasher-safe material such that both the pedestal 50 and the basin 52 can be cleaned using a dishwasher.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A collapsible pedestal comprising a plurality of pairs of pedestal legs, each one of the plurality of pairs of pedestal legs having first and second sets of hinge knuckles, the first set of hinge knuckles of each one of the plurality of pairs of the pedestal legs pivotally engaged with the second set of hinge knuckles of another one of the plurality of pairs of the pedestal legs disposed adjacent thereto forming a pedestal supportable on the plurality of pairs of pedestal legs;
wherein each one of the plurality of pedestal legs is pivotally connected about a plurality of pivot axes to a plurality of adjacent pedestal legs, and wherein (a) pivotal engagement between the first set of hinge knuckles of the one of the pedestal legs and the second set of hinge knuckles of a first adjacent one of the pedestal legs defines a first one of the plurality of pivot axes about which the one of the pedestal legs and the first adjacent one of the pedestal legs are pivotable, and (b) pivotal engagement between the second set of hinge knuckles of the one of the pedestal legs and the first set of hinge knuckles of a second adjacent one of the pedestal legs defining a second one of the plurality of pivot axes about which the one of the pedestal legs and the second adjacent one of the pedestal legs are pivotable; and
wherein, for each one of the plurality of pedestal legs, the first and second sets of hinge knuckles are respectively comprised of axially spaced apart knuckles with the knuckles of the first set of hinge knuckles axially staggered relative to the knuckles of the second set of hinge knuckles.

2. The collapsible pedestal of claim 1 wherein the plurality of pairs of pedestal legs are movable between (a) an operating position where the plurality of pairs of pedestal legs are angularly spaced apart from one another enabling the plurality of pairs of pedestal legs to uprightly support the pedestal on a generally horizontal surface, and (b) a collapsed position where the plurality of pedestal legs are folded against one in another.

3. The collapsible pedestal of claim 1 wherein the first set of hinge knuckles of each one of the plurality of pairs of pedestal legs pivotably engages the second set of hinge knuckles of an adjacent one of the plurality of pairs of pedestal legs defining a pivot therebetween about which each one of the plurality of pairs of pedestal legs is pivotable relative to the adjacent one of the plurality of pairs of pedestal legs.

4. The collapsible pedestal of claim 3 wherein the number of pivots formed by pivotable engagement between the first set of hinge knuckles of each one of the pedestal legs with the second set of hinge knuckles of the adjacent one of the pedestal legs is greater than the number of pedestal legs.

5. The collapsible pedestal of claim 3 wherein each one of the plurality of pairs of pedestal legs has a generally horizontally extending support underlying and supporting an object carried by the pedestal and a generally upraised abutment against which an object on the support can abut, and wherein each one of the pivots has a generally vertically extending pivot axis and axially underlies an object on the support.

6. The collapsible pedestal of claim 1 wherein (a) the pedestal is reversible with each one of the plurality of pairs of pedestal legs being generally T-shaped with a generally horizontally extending support having object-supporting surfaces on opposite sides thereof and a pair of abutments extending oppositely outwardly thereof against which an object carried by the pedestal can abut, (b) wherein for each one of the plurality of pairs of pedestal legs (i) one support surface faces upwardly and one abutment of the abutment pair extends upwardly and configured to support one object, and (ii) the other abutment of the abutment pair extends downwardly defining a foot upon which the pedestal is supported when the pedestal is disposed in one orientation; and (c) wherein for each one of the plurality of pairs of pedestal legs (i) the other support surface faces upwardly and the other abutment of the abutment pair extends upwardly and configured to support a different object, and (ii) the one abutment of the abutment pair extends downwardly defining a foot upon which the pedestal is supported when the pedestal is disposed in an opposite orientation.

7. The collapsible pedestal of claim 6 wherein the one of the support surfaces and abutment of the abutment pair of each one of the plurality of pairs of pedestal legs defines a first object cradle configured to receive and substantially conform to one object having one three dimensional shape when the pedestal is disposed in the one orientation and the other one of the support surfaces and abutment of each one of the plurality of pairs of pedestal legs defines a second object cradle configured to receive and substantially conform to another object having another three dimensional shape different than the three dimensional shape of the one object when the pedestal is disposed in the opposite orientation.

8. The collapsible pedestal of claim 1 wherein each one of the plurality of pedestal legs is formed of an elongate generally horizontal radially extending object support comprised of (a) a foot extending generally downwardly from one end of the object support, and (b) the first and second sets of hinge knuckles extending generally vertically from an opposite end of the object support.

9. The collapsible pedestal of claim 8 wherein each one of the pedestal legs has an elongate generally vertically extending oblong opening formed in the foot that defines a manually graspable handle.

10. The collapsible pedestal of claim 1 wherein, for each one of the plurality of pedestal legs, the knuckles of the first set of hinge knuckles are generally coaxial about a first one of the plurality of pivot axes and the knuckles of the second set of hinge knuckles are generally coaxial with a second one of the plurality of pivot axes transversely spaced apart from and generally parallel with the first one of the plurality of pivot axes.

11. The collapsible pedestal of claim 10 wherein each one of the knuckles of the first and second sets of hinge knuckles is comprised of a generally cylindrical knuckle barrel.

12. A fold-up pedestal comprising at least three pedestal legs with each pedestal leg (a) pivotally engaging one adjacent pedestal leg defining a first pivot and first pivot axis about which one adjacent pair of pivotably engaged pedestal legs are pivotable and (b) pivotally engaging another adjacent pedestal leg defining a second pivot and second pivot axis about which another adjacent pair of pivotably engaged pedestal legs are pivotable;
wherein the first pivot and second pivot respectively define first and second pivot axes that are spaced apart and generally parallel;
wherein each pedestal leg comprises a first set of hinge knuckles and a second set of hinge knuckles extending from a generally horizontally extending support with the first set of hinge knuckles pivotably engaging the second set of hinge knuckles of the one adjacent pedestal leg defining the first pivot and the second set of hinge knuckles pivotably engaging the first set of hinge knuckles of the another adjacent pedestal leg defining the second pivot; and
wherein the first set of hinge knuckles and the second set of hinge knuckles of each pedestal leg are each comprised of a plurality of knuckles generally axially spaced apart by a space that enables (a) knuckles of the first set of hinge knuckles to be received between knuckles of the second set of hinge knuckles of the one adjacent pedestal leg, and (b) knuckles of the second set of hinge knuckles to be received between knuckles of the first set of hinge knuckles of the another adjacent pedestal leg.

13. The fold-up pedestal of claim 12 wherein each pedestal leg is comprised of a generally horizontally extending object support extending radially outwardly from the first and second sets of hinge knuckles, the object support having a generally downwardly extending pedestal foot disposed at one end of the object support, and wherein the first and second sets of hinge knuckles are disposed at an opposite end of the object support.

14. The fold-up pedestal of claim 13 wherein the pedestal is of reversible construction with the object support of each pedestal leg having (a) a first generally horizontally extending object supporting surface that (1) faces generally upwardly when the pedestal is oriented in an upside up position, and (2) faces generally downwardly when the pedestal is oriented in an upside down position, and (b) a second generally horizontally extending object supporting surface that (1) faces generally downwardly when the pedestal is oriented in the upside up position, and (2) faces generally upwardly when the pedestal is oriented in the upside down position.

15. The fold-up pedestal of claim 14 wherein each pedestal leg is generally T-shaped with the pedestal foot having a first portion extending generally downward defining the pedestal is supported when oriented in the upside up position and which faces generally upwardly when the pedestal is oriented in the upside down position, and (b) a second portion extending generally upwardly defining a second pedestal supporting surface upon which the pedestal is supported when oriented in the upside down position and which faces generally upwardly when the pedestal is oriented in the upside up position.

16. The fold-up pedestal of claim 15 wherein each one of the knuckles of the first and second sets of hinge knuckles of each pedestal leg is comprised of a generally cylindrical knuckle barrel, wherein the knuckles of one of the sets of hinge knuckles of one pedestal leg are pivotally connected to the knuckles of the other one of the sets of hinge knuckles of one adjacent pedestal leg by one elongate generally cylindrical pivot pin defining the first pivot pivotally interconnecting the one pedestal leg with the one adjacent pedestal leg and the knuckles of the other one of the sets of hinge knuckles of the one pedestal leg are pivotally connected to the knuckles of the one of the sets of hinge knuckles of another adjacent pedestal leg by another elongate generally cylindrical pivot pin defining the second pivot pivotally interconnecting the one pedestal leg with the another adjacent pedestal leg.

17. The fold-up pedestal of claim 12 wherein the pedestal is of reversible construction comprised of a first cradle when upside up that is configured to hold a first object and a second cradle when upside down configured to hold a second object.

18. A collapsible pedestal for holding an object comprising a plurality of pairs of substantially identical pedestal legs, each pedestal leg having:
a vertical section comprising a downwardly extending pedestal foot and an upwardly extending abutment, and
a horizontal section comprising a generally horizontal support extending from the vertical section into a free end, the free end carrying a pair of sets of hinge knuckles with one of the sets of hinge knuckles comprised of a plurality of generally coaxial and axially spaced apart knuckles and the other one of the sets of hinge knuckles comprises a second plurality of generally coaxial knuckles axially spaced apart and staggered relative to the knuckles of the one of the sets of hinge knuckles,
wherein the knuckles of the one of the sets of hinge knuckles of one pedestal leg are pivotally connected to the knuckles of the other one of the sets of hinge knuckles of one adjacent pedestal leg by one pivot pin defining a first pivot pivotally interconnecting the one pedestal leg with the one adjacent pedestal leg, and the knuckles of the other one of the sets of hinge knuckles of the one pedestal leg are pivotally connected to the knuckles of the one of the sets of hinge knuckles of another adjacent pedestal leg by another pivot pin defining a second pivot pivotally interconnecting the one pedestal leg with the another adjacent pedestal leg.

19. The collapsible pedestal of claim 18 wherein the first and second pivots are generally vertically extending and disposed alongside one another.

20. The collapsible pedestal of claim 19 wherein each one of the knuckles of each one of the hinge knuckles of each one of the plurality of pairs of pedestal legs is comprised of a generally cylindrical knuckle barrel.

21. The collapsible pedestal of claim 20 wherein the generally cylindrical knuckle barrel of each knuckle of each one of the sets of hinge knuckles of each one of the plurality of pairs of pedestal legs has a bore formed therein that accepts one of the first and second pivot pins.

22. The collapsible pedestal of claim 18 wherein each one of the plurality of pairs of pedestal legs are made of a dishwasher-safe material.

23. The collapsible pedestal of claim 18 wherein the pedestal is comprised of four of the substantially identical pedestal legs.

24. The collapsible pedestal of claim 18 wherein the knuckles of the one of the sets of hinge knuckles of each one of the pedestal legs are intermeshed between and generally coaxially aligned with the knuckles of the other one of the sets of hinge knuckles of the one adjacent pedestal leg and the knuckles of the other one of the sets of hinge knuckles of the each one of the pedestal legs are intermeshed between and generally coaxially aligned with the knuckles of the one of the sets of hinge knuckles of the another adjacent pedestal leg.

25. The collapsible pedestal of claim 18 wherein plurality of pairs of substantially identical pedestal legs are movable between (a) an operating position where the plurality of pairs of pedestal legs are substantially equally angularly spaced apart from one another enabling the plurality of pairs of pedestal legs to uprightly support the pedestal on a generally horizontal surface, and (b) a collapsed position where the plurality of pedestal legs are folded.

26. The collapsible pedestal of claim 25 wherein each of the pedestal legs are foldable against adjacent pedestal legs when disposed in the collapsed position.

27. The collapsible pedestal of claim 25 wherein the pedestal legs define a first object cradle configured to receive and substantially conform to one of a pet bowl, a pet dish, a water fountain, a basin, and a pet feeder when in the operating position.

28. The fold-up pedestal of claim 16 wherein the first set and second set of hinge knuckles of pedestal legs respectively pivotally interconnected by corresponding pivot pins form a structurally reinforced rigidifying tube for reinforcing the pedestal.

29. The collapsible pedestal of claim 8 wherein the first set of hinge knuckles of each one of the plurality of pedestal legs and the second set of hinge knuckles of each one of the pedestal legs are pivotally interconnected by a generally cylindrical pivot pin to respective hinge of a corresponding one of the first set of hinge knuckles and the second set of hinge knuckles of an adjacent one of the pedestal legs forming a structurally reinforced rigidifying tube for reinforcing the pedestal.

* * * * *